Oct. 4, 1949.  S. SARETZKY  2,483,848
SYNCHRONOUS MOTOR
Filed Dec. 14, 1946

INVENTOR.
SIMON SARETZKY
BY Jenney & Hildreth
ATTORNEYS

Patented Oct. 4, 1949

2,483,848

UNITED STATES PATENT OFFICE 2,483,848

SYNCHRONOUS MOTOR

Simon Saretzky, Newton, Mass., assignor, by mesne assignments, to Holtzer-Cabot, Inc., Boston, Mass., a corporation of Delaware Application December 14, 1946, Serial No. 716,205

13 Claims. (Cl. 172—120)

The present invention relates to self-starting synchronous motors and more particularly to motors of the so-called reluctance or synchronous induction type which are frequently used for driving clocks or other low power devices.

It is well known that if the rotor of a squirrel cage induction motor is cut to form salient poles, the motor will start as an induction motor and will have a pull-in torque tending to make it lock in at synchronous speed. A common method of forming salient poles on the rotor is to form flat portions thereon and another is to cut slots in the rotor. In either case the reluctance of the magnetic path across the rotor is greater in some positions than in others. Since any magnetic element tends to assume a position in which the reductance of the flux path is a minimum, such motors frequently exhibit a noticeable "cogging" effect. This effect may be so serious that the motor may have insufficient starting torque.

The object of the present invention is to provide a simple and inexpensive motor of this general type having satisfactory pull-in and starting characteristics. To this end the invention comprises a motor hereinafter described and particularly defined in the claims.

Figure 1:
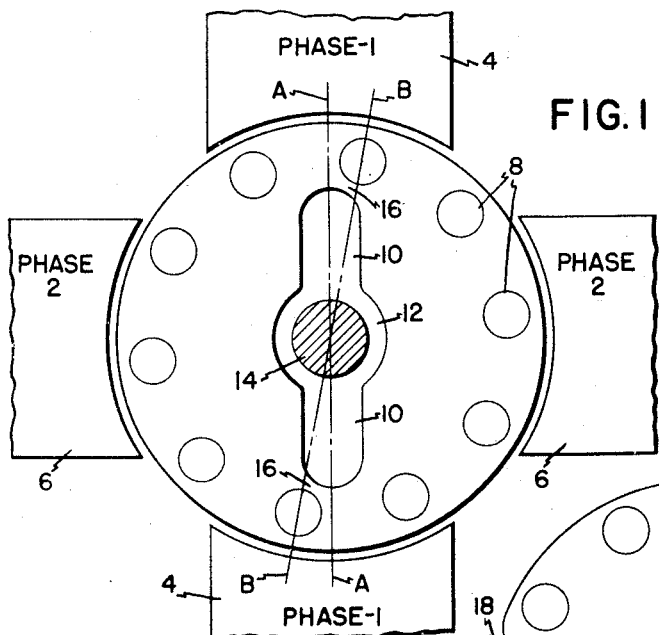
Figure 2:
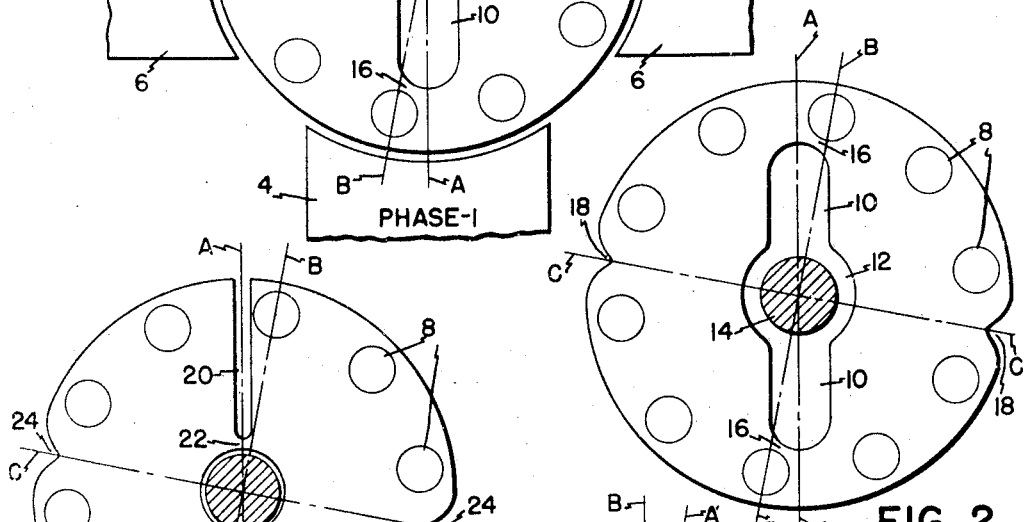
Figure 3:
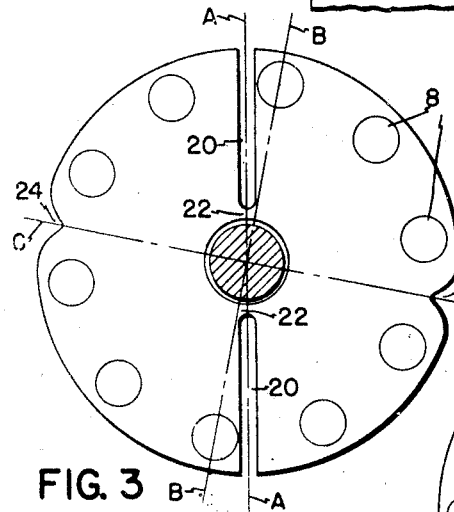
Figure 4:
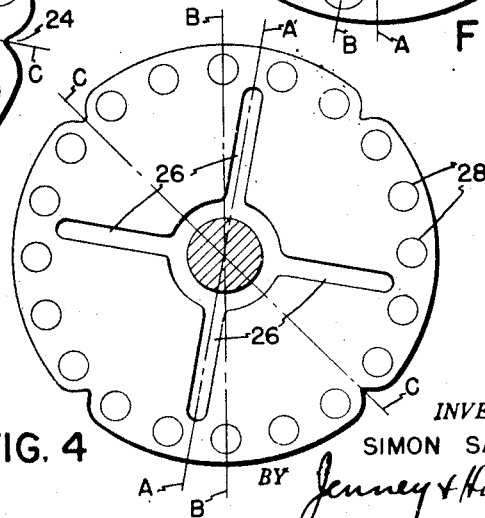

In the accompanying drawings Fig. 1 is a diagram of a motor according to the present invention; and Figs. 2, 3 and 4 show modified forms of rotor.

The motor shown in Fig. 1 comprises a two-phase two-pole motor adapted to run at speed of 3600 R. P. M. when energized at 60 cycles. The stator is provided with a single pair of salient poles for each phase, the poles being designated at 4 and 6. The actual stator construction may be of any suitable form and the poles are only diagrammatically shown in the drawing.

The rotor shown in Fig. 1 is of the squirrel cage type and is here illustrated as having ten conductors indicated at 8. The rotor conductors are short-circuited at their ends in the usual manner. In order to provide rotor poles, the rotor is slotted as indicated at 10. For a two-pole motor, the rotor is provided with two diametrically opposed slots 10. In Fig. 1 the slots are internal whereby they produce no interruption of the rotor surface at the periphery. The rotor slots are connected by a central opening 12. The rotor is suitably mounted on a shaft 14, preferably of non-magnetic material.

It will be observed from Fig. 1 that the rotor slots are asymmetrically disposed with relation to the conductors. The purpose of this will be described later. It will be further noted that the ends of the slots approach two of the conductors rather closely, forming narrow bridges 16 through which the major part of the flux is constrained to pass when the axis of the slots is at right angles to the polar axis of the stator. The bridges 16 then become saturated. Thus, in respect to the stator flux due to the poles 4 of one phase, the rotor has a minimum reluctance when it is in the position of Fig. 1, when none of the flux is required to pass through the bridges 16, and a maximum reluctance when the rotor is 90° displaced therefrom, so that the flux is required to pass through the bridges. Thus the axis AA which coincides with the axes of the slots is the axis of the path of minimum reluctance due to the slots, and hence may be considered the polar axis of the poles of the rotor.

It has been pointed out that the slots 10 are asymmetrically disposed with respect to the conductors 8. With ten conductors the conductor spacing is 36°. The axis through a conductor is shown at BB. Preferably the angle between AA and BB is about 9°.

There are variations in rotor reluctance due to the conductors. Thus the axis BB and every axis through the middle of a conductor is an axis of minimum reluctance. It will be understood that the position of the axis of minimum reluctance depends on the width of the stator poles, and does not necessarily pass through the middle of a conductor. For the pole width shown in Fig. 1, the minimum reluctance axis corresponds with the axis through a conductor. In any event there will be an axis BB which represents a direction of minimum reluctance due to the conductors. Owing to the displacement between the slot axis AA and the axis BB, the positions of minimum reluctance due to the slots and to the conductors are not coincident. While the reluctance variations due to the conductors are relatively small compared to those due to the slots they are sufficient to overcome the tendency of the rotor to lock in at any position determined by the minimum reluctance path AA at starting or at any speed below synchronism. Hence, the starting torque is improved.

The rotor shown in Fig. 2 is similar to that of Fig. 1 except that notches 18 are cut in the rotor at its periphery. Preferably two such notches are cut per pair of poles, the notches being diametrically opposite and on a mid-conductor axis CC displaced 90° from the axis BB. Thus the notches tend to form salient rotor poles on the axis BB. This has been found to give a higher pull-in torque, but at a possible slight sacrifice of starting torque due to the interruption of the periphery of the rotor.

Instead of internal slots as in Figs. 1 and 2, external slots may be used as shown in Fig. 3. In this case the slots 20 extend from the periphery toward the center of the rotor. The saturable bridges 22 form the paths of high reluctance in certain rotor positions. As in Fig. 1, the axes of the slots are asymmetrical with respect to the conductors. The bridges are near the center but the operation is substantially identical with that of the motor of Fig. 1. Notches 24 may be cut in the periphery on the axis CC for the same purpose as described for the notches 18 for Fig. 2.

The rotor may be made for a larger number of poles. Thus, as shown in Fig. 4, the rotor is constructed for two pairs of poles, namely with four slots 26 disposed about the rotor symmetrical with respect to one another but asymmetric with respect to the conductors 28. In this figure, the axis AA is shown as displaced slightly toward one of the conductors; the axis BB is here drawn through a conductor and represents an axis of minimum reluctance due to the presence of the conductors. The rotor may be notched on axes at 90 electrical degrees from BB; one such notch axis is shown at CC. The considerations applicable to the motors previously described are equally applicable to Fig. 4.

Although a two-phase motor has been specifically described, it will be understood that the stator construction may be of any suitable form for single-phase or polyphase operation, as will be understood by those skilled in this art.

Having thus described my invention, I claim:

1. A synchronous motor having a rotor provided with short-circuited conductors uniformly disposed about the rotor, and a plurality of slots to form poles, said slots being disposed uniformly about the rotor in diametrically opposite pairs and asymmetrically disposed with respect to the conductors.

2. A synchronous motor having a rotor provided with short-circuited conductors uniformly disposed about the rotor, and a plurality of slots disposed uniformly about the rotor to form poles, the axis of minimum reluctance of the rotor due to said slots being displaced from the axis of minimum reluctance due to the presence of said conductors.

3. A synchronous motor having a rotor provided with short-circuited conductors uniformly disposed about the rotor, and a plurality of slots to form poles, said slots being disposed symmetrically with respect to one another but asymmetrically with respect to the conductors, the rotor having peripheral notches to form salient poles substantially coincident with an axis of minimum reluctance due to the presence of the conductors.

4. A synchronous motor having a rotor provided with short-circuited conductors uniformly disposed about the rotor, and a plurality of slots to form poles, said slots being disposed symmetrically with respect to one another but asymmetrically with respect to the conductors, the rotor having peripheral notches to form salient poles displaced from the axes of the poles formed by the slots.

5. A synchronous motor having a rotor provided with short-circuited conductors uniformly disposed about the rotor, and a plurality of slots disposed uniformly about the rotor to form poles, the polar axes being displaced from the axes of minimum reluctance due to the presence of the conductors.

6. A synchronous motor having a rotor provided with short-circuited conductors uniformly disposed about the rotor, and a plurality of slots to form poles, the polar axes being displaced from the axes of minimum reluctance due to the presence of the conductors, the rotor having peripheral notches to form salient poles displaced from the axes of the poles formed by the slots.

7. A synchronous motor having a rotor provided with short-circuited conductors uniformly disposed about the rotor, and a plurality of slots to form poles, said slots being asymmetric with respect to the conductors, and each slot being disposed internally of the rotor and terminating near a conductor to form a saturable bridge for passage of flux in certain rotor positions.

8. A synchronous motor having a rotor provided with short-circuited conductors uniformly disposed about the rotor, and a plurality of slots disposed uniformly about the rotor to form poles, said slots being asymmetric with respect to the conductors, and each slot extending from the periphery to an internal point of the rotor.

9. A synchronous motor having a rotor provided with short-circuited conductors uniformly disposed about the rotor, and a plurality of slots to form poles, said slots being asymmetric with respect to the conductors, and each slot being disposed internally of the rotor and terminating near a conductor to form a saturable bridge for passage of flux in certain rotor positions, the rotor being formed with peripheral notches to form salient poles non-coincident with the poles formed by the slots.

10. A synchronous motor having a rotor provided with short-circuited conductors uniformly disposed about the rotor, and a plurality of slots to form poles, said slots being asymmetric with respect to the conductors, and each slot extending from the periphery to an internal point of the rotor, the rotor being formed with peripheral notches to form salient poles non-coincident with the poles formed by the slots.

11. A synchronous motor having a rotor provided with short-circuited conductors uniformly disposed about the rotor, and a plurality of slots disposed uniformly about the rotor, the slots being arranged to form saturable bridges and thereby to determine axes of maximum and minimum reluctance of the rotor, the conductors also determining axes of minimum reluctance, the axes of minimum reluctance due to the slots and to the conductors being displaced asymmetrically from one another.

12. A synchronous motor having a rotor provided with short-circuited conductors uniformly disposed about the rotor, and a plurality of slots disposed uniformly about the rotor, each slot terminating near a conductor to form saturable bridges and thereby to determine axes of maximum and minimum reluctance of the rotor, the conductors also determining axes of minimum reluctance, the axes of minimum reluctance due to the slots and to the conductors being displaced asymmetrically from one another.

13. A synchronous motor having a rotor provided with short-circuited conductors uniformly disposed about the rotor, and a plurality of slots disposed uniformly about the rotor, each slot extending inwardly from the periphery to an internal point of the rotor to form saturable bridges and thereby to determine axes of maximum and minimum reluctance of the rotor, the conductors also determining axes of minimum reluctance, the axes of minimum reluctance due to the slots and to the conductors being displaced asymmetrically from one another.

SIMON SARETZKY.

REFERENCES CITED

The following references are of record in the file of this patent:

UNITED STATES PATENTS

| Number | Name | Date |
| --- | --- | --- |
| 1,945,028 | D'Almaine et al. | Jan. 30, 1934 |
| 1,957,551 | Nierlich | May 8, 1934 |